(12) United States Patent
Farmwald

(10) Patent No.: US 11,548,579 B2
(45) Date of Patent: Jan. 10, 2023

(54) METHODS FOR VALIDATING MANUFACTURING EQUIPMENT FOR USE DURING PRODUCTION OF A MOTOR VEHICLE

(71) Applicant: Toyota Motor Engineering & Manufacturing North America, Inc., Plano, TX (US)

(72) Inventor: Nicholas A. Farmwald, Covington, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/234,851

(22) Filed: Apr. 20, 2021

(65) Prior Publication Data

US 2022/0332380 A1 Oct. 20, 2022

(51) Int. Cl.
*B62D 65/02* (2006.01)
*G01M 99/00* (2011.01)

(52) U.S. Cl.
CPC ......... *B62D 65/026* (2013.01); *G01M 99/005* (2013.01)

(58) Field of Classification Search
CPC ........................... B62D 65/026; G01M 99/005
USPC ....................................................... 73/865.9
See application file for complete search history.

(56) References Cited

U.S. PATENT DOCUMENTS

| | | | |
|---|---|---|---|
| 2008/0252099 A1 | 10/2008 | Terry et al. | |
| 2013/0036899 A1 | 2/2013 | Tucker | |
| 2017/0050677 A1* | 2/2017 | Czinger | B62D 29/046 |
| 2017/0343984 A1* | 11/2017 | Czinger | G06F 30/17 |
| 2019/0030751 A1* | 1/2019 | Czinger | B33Y 80/00 |
| 2019/0391563 A1* | 12/2019 | Macey | B33Y 50/00 |
| 2020/0011485 A1 | 1/2020 | Kunberger | |
| 2020/0216130 A1* | 7/2020 | Von Krauland | B65G 17/005 |

FOREIGN PATENT DOCUMENTS

| | | |
|---|---|---|
| CN | 208344057 U | 1/2019 |
| DE | 102018211346 A1 | 1/2020 |

* cited by examiner

*Primary Examiner* — Douglas X Rodriguez
*Assistant Examiner* — Byung Ro Lee
(74) *Attorney, Agent, or Firm* — Dinsmore & Shohl LLP

(57) ABSTRACT

Methods for validating manufacturing equipment for use during the production of a motor vehicle include identifying touchpoints on the underbody of a vehicle, machining a foam underbody, and validating manufacturing equipment using the foam underbody. A three-dimensional model of the underbody of the vehicle may be used to identify the touchpoints and for machining the foam underbody. The foam underbody includes a polyurethane foam. At least the touchpoints of the foam underbody are machined to a tolerance of less than or equal to +/−3 millimeters with reference to the touchpoints on the three-dimensional model.

16 Claims, 3 Drawing Sheets

METHODS FOR VALIDATING MANUFACTURING EQUIPMENT FOR USE DURING PRODUCTION OF A MOTOR VEHICLE

FIELD

The present application is related to the production of motor vehicles, and more specifically, to methods for validating manufacturing equipment used during the production of motor vehicles.

BACKGROUND

The mass production of a motor vehicle requires the use of various pieces of equipment. As examples, equipment may be used to move the motor vehicles through a manufacturing facility and robotics may be used for various functions during of vehicle production. In addition, structures that support the motor vehicle while manufacturing processes are conducted are used. When a new vehicle is to be mass produced, these pieces of equipment must be adapted to the design of the new vehicle. Accordingly, there is a need for methods for validating manufacturing equipment for the production of a motor vehicle.

SUMMARY

Conventional methods for validating manufacturing equipment include producing a concept vehicle and using that concept vehicle to produce or adjust the manufacturing equipment. However, concept vehicles are often produced by hand, which often results in long production times for the concept vehicles. The long production times of concept vehicles may delay the validation process for manufacturing equipment, which in turn, may lengthen the production cycles for new vehicles. Alternatively, a model of the underbody of a concept vehicle may be produced from machining board or 3D printed. However, models produced from machining board are often too heavy to accurately reproduce the weight and weight distribution of the vehicle, and models produced by 3D printing are often too flimsy to be useful for verifying pieces of manufacturing equipment.

Methods for validating manufacturing equipment described herein address at least some of these concerns. Generally, the design for a vehicle is finalized before a concept vehicle is produced. The design data for the vehicle may be used to produce an accurate model of the underbody of the vehicle from foam. This foam underbody may mimic the weight and center of gravity of the underbody of the vehicle and generally is rigid and durable enough to use for verifying manufacturing equipment. Once produced, the foam underbody may be used to validate the manufacturing equipment necessary for the mass production of the new vehicle, often months before a physical concept vehicle would be available for equipment validation.

According to embodiments, methods for validating manufacturing equipment for use during production of a motor vehicle may include identifying the touchpoints on the underbody of a vehicle using data from a three-dimensional model of an underbody of the vehicle; machining a foam underbody using the data from the three-dimensional model of the underbody of the vehicle; and validating manufacturing equipment using the foam underbody. The foam underbody may include polyurethane foam. At least the touchpoints of the foam underbody may be machined to a tolerance of less than or equal to +/−3 millimeters with reference to the three-dimensional model of the underbody of the vehicle.

It is to be understood that both the foregoing general description and the following detailed description describe various embodiments and are intended to provide an overview or framework for understanding the nature and character of the claimed subject matter. Additional features and advantages of the technology disclosed herein will be set forth in the detailed description that follows, and in part will be readily apparent to those skilled in the art from that description or recognized by practicing the technology as described herein, including the detailed description that follows as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
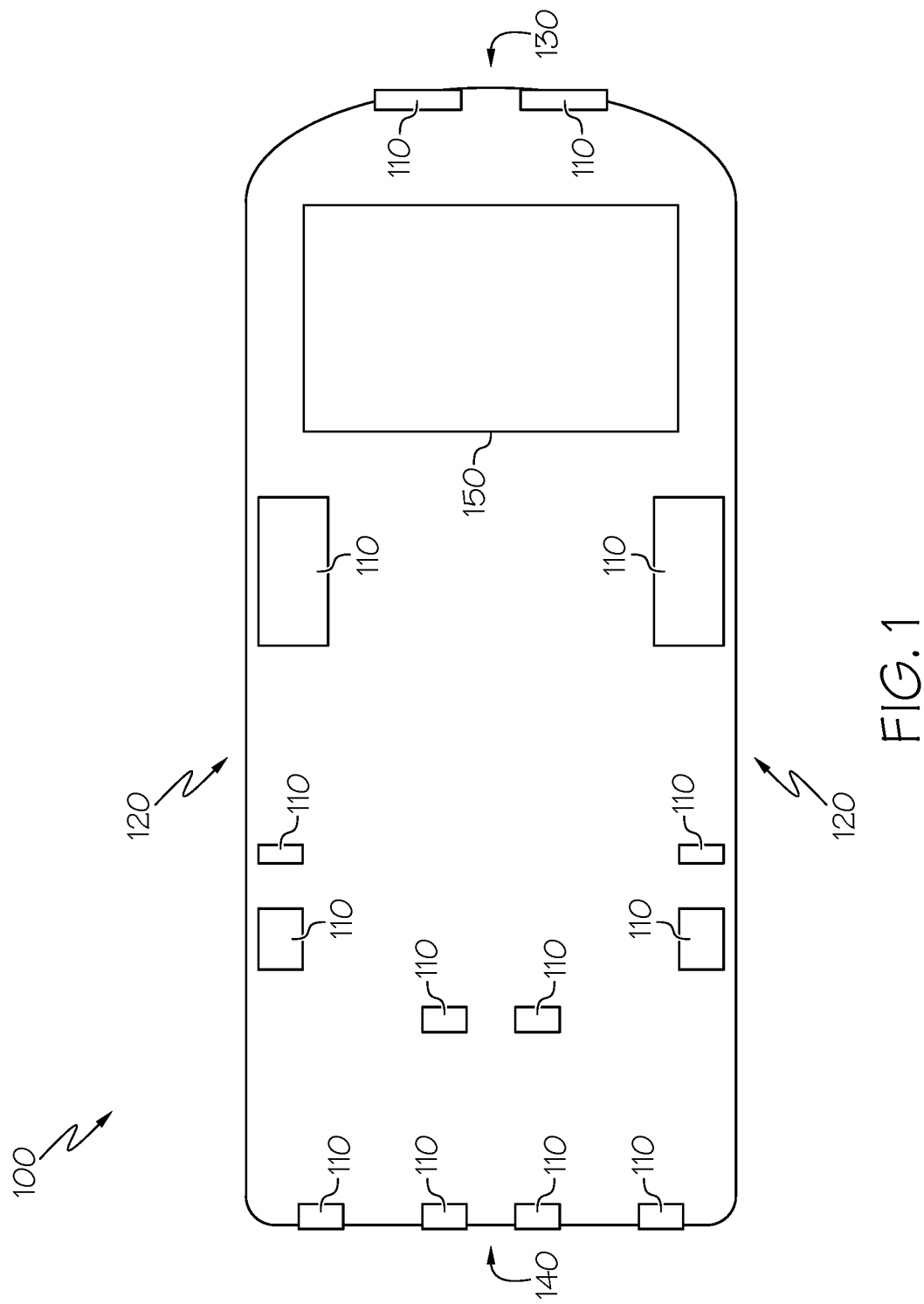
FIG. 1 schematically depicts a foam underbody used to validate manufacturing equipment, according to one or more embodiments disclosed herein.

Methods for validating manufacturing equipment for use during the production of a motor vehicle may include identifying touchpoints on the underbody of the vehicle, machining a foam underbody and validating the manufacturing equipment using the foam underbody. A three-dimensional model of the underbody of the vehicle may be used to identify the touchpoints on the underbody of the vehicle and data from the three-dimensional model may be used for machining the foam underbody.

Methods for validating manufacturing equipment for use during the production of a motor vehicle may include identifying touchpoints on the underbody of the vehicle, such as by identifying the touchpoints from a three-dimensional model of the underbody of the vehicle. Touchpoints are any area of an underbody that contact a piece of manufacturing equipment and may include, without limitation, protrusions in the underbody, and rigid or support elements in the structure of the underbody of the vehicle. For example, when an underbody is placed on a floor dolly, the points at which the underbody contacts the floor dolly are touchpoints. Touchpoints may be identified by any suitable means.

The three-dimensional model may be any suitable three-dimensional model. For example, the three-dimensional model may be a computerized model created in any suitable three-dimensional modeling program or application. In embodiments, the three-dimensional model includes information of the dimensions of the components making up the underbody of the vehicle. The three-dimensional model may further include information or data on the mass of the underbody of the vehicle and the center of gravity of the vehicle.

Generally, a three-dimensional model of the underbody of a vehicle is finalized before a physical concept vehicle is produced. Further, a foam underbody can be produced using the three-dimensional model of the underbody well before a concept vehicle can be produced. Accordingly, a foam underbody may be used to validate manufacturing equipment before the production of a concept vehicle. Using a foam underbody to validate manufacturing equipment may expedite the process of preparing a manufacturing facility for the production of a new vehicle, by allowing the validation process to begin before the production of a concept vehicle is complete.

Methods for validating manufacturing equipment for use during production of a motor vehicle may include machining a foam underbody. In embodiments, the foam underbody may be machined from one or more volumes of foam. For example, the foam underbody may be machined from a single volume of foam or from two or more volumes of foam that are joined together. In embodiments where the foam underbody is machined from multiple volumes of foam, the multiple volumes of foam may be joined by an adhesive, one or more fasteners, or any suitable means for joining the volumes of foam. In embodiments, the volumes of foam may be blocks of foam; however, volumes of foam of any suitable shape may be used.

In embodiments, the foam underbody may comprise a polyurethane foam. Suitable polyurethane foams may be rigid and of an appropriate density to approximate the mass of the underbody of the vehicle. For example, the polyurethane foam may be General Plastics FR-4530 Rigid Polyurethane Material obtainable from General Plastics Manufacturing Company, Tacoma, Wash. Alternatively, the polyurethane foam may be any other comparable polyurethane foam.

Machining the foam underbody may be accomplished by any suitable means, such as cutting, carving, grinding, sanding, shaping, forming, punching, drilling, or any other suitable means of changing the shape of an object. In embodiments, the foam underbody may be machined using equipment suitable for machining the polyurethane foams described herein. In embodiments, the foam underbody may be machined using data from a three-dimensional model of the underbody of a vehicle including the touchpoints from the three-dimensional model of the underbody of the vehicle. With reference now to FIG. 1, a machined foam underbody 100 comprises touchpoints 110 that have been machined into the foam underbody to correspond with touchpoints from the three-dimensional model of the underbody of the vehicle.

In embodiments, at least the touchpoints 110 of the foam underbody 100 may be machined to a tolerance of less than or equal to +/−3 millimeters (mm) with reference to the touchpoints from the three-dimensional model of the underbody of the vehicle. For clarity, this should be understood to mean that, in embodiments, a touchpoint machined in the foam underbody is positioned to be within +/−3 mm of the position of the corresponding touchpoint the three-dimensional model of the underbody of the vehicle. For example, at least the touchpoints 110 of foam underbody 100 may be machined to a tolerance of less than or equal to +/−3 mm, +/−2.5 mm, +/−2 mm, +/−1.5 mm, +/−1 mm, or +/−0.5 mm with reference to the touchpoints from the three-dimensional model. In embodiments, at least the touchpoints 110 of foam underbody 100 may be machined to a tolerance from +/−0.5 mm to +/−1.5 mm with reference to the touchpoints from the three-dimensional model. For example, at least the touchpoints 110 of the foam underbody 100 may be machined to a tolerance of +/−0.5 mm, +/−0.6 mm, +/−0.7 mm, +/−0.8 mm, +/−0.9 mm, +/−1.0 mm, +/−1.1 mm, +/−1.2 mm, +/−1.3 mm, +/−1.4 mm, +/−1.5 mm with reference to the touchpoints from the three-dimensional model, or any range of these values. In embodiments, additional areas of the foam underbody 100 may be machined to the same tolerance as the touchpoints 110 of the foam underbody. For example, in embodiments, the entire lower surface of the foam underbody 100 may be machined to have components and contours that have a tolerance of less than or equal to +/−3 mm with reference to the components and contours from the three-dimensional model. In embodiments, the sides 120 of the foam underbody 100, front 130 of the foam underbody 100, rear 140 of the foam underbody 100, or combinations of these may be machined to a tolerance of less than or equal to +/−3 mm with reference to the sides, front, and rear of the three-dimensional model.

Without intending to be bound by theory, it is believed that the components (including but not limited to touchpoints) of a concept vehicle usually are produced to a tolerance of from about +/−3 mm to about +/−4 mm with reference to the components of the three-dimensional model. Accordingly, embodiments of foam underbodies may be produced to narrower tolerances than the traditional concept vehicles, allowing for more accurate tuning and validation of the manufacturing equipment.

The touchpoints 110 of the foam underbody 100 are generally high wear areas. As such, materials with increased durability may be used at the touchpoints 110 of the foam underbody 100. In embodiments, at least one of the touchpoints 110 of the foam underbody 100 may be machined out of a dense foam or a metal to form an insert. These dense foam or metal inserts may then be inserted into the foam underbody 100 at the position of the corresponding touchpoint 110. Accordingly, in embodiments, the foam underbody 100 may include a dense foam insert at at least one of the touchpoints 110 on the foam underbody 100. In embodiments, the foam underbody 100 may include a metal insert at at least one of the touchpoints 110 on the foam underbody 100. In embodiments, the foam underbody 100 may comprise a dense foam insert or a metal insert at each touchpoint 110 of the foam underbody 100. The inserts may be attached to the foam underbody 100 by any suitable means including suitable adhesives or suitable fasteners.

The dense foam insert may include any foam material that is more dense than the foam material used to form the majority of the foam underbody 100. In embodiments, the dense foam insert may include any foam that is more resistant to scratches, abrasion, gouging, perforation, or other forms of wear that may result from repeated contact between the manufacturing equipment and the touchpoint 110. The metal inserts may include any suitable metal, such as but not limited to aluminum or steel.

In embodiments, areas of the foam underbody 100 that are less useful for validating the manufacturing equipment may be machined to a lower tolerance than those previously described. For example, top surfaces of the foam underbody 100, which generally have minimal interactions with the manufacturing equipment, may be machined to a lower tolerance. In embodiments, such surfaces may be machined to be smooth or may not be machined at all. Such measures may reduce the cost of machining the foam underbody 100 with minimal impact on the suitability of the foam underbody for verifying manufacturing equipment.

In embodiments, the foam underbody 100 may include one or more cavities 150. The cavities may be machined into the foam underbody 100 such that the foam underbody 100 approximates the mass and center of gravity of the underbody of the vehicle. For example, the foam underbody may have a mass that is within 30%, 25%, 20%, 15%, 10%, 5%, or 1% of the mass of the underbody of the vehicle referenced in the three-dimensional model of the underbody of the vehicle. In further examples, the foam underbody may have a center of gravity that is within 500 mm, 400 mm, 300 mm, 200 mm, 100 mm, 90 mm, 80 mm, 70 mm, 60 mm, 50 mm, 40 mm, 30 mm, 20 mm, 10 mm, or even 5 mm in any direction from the center of gravity referenced in the three-dimensional model of the underbody of the vehicle. As described herein, the three-dimensional model of the underbody of the vehicle may include information regarding the mass and center of gravity of the vehicle. It should be understood that the foam underbody 100 approximates the mass and center of gravity of the vehicle as described in the three-dimensional model such that the foam underbody 100 may be produced before a concept vehicle is produced.

In embodiments, the foam underbody 100 may comprise means for lifting or otherwise moving the foam underbody 100. For example, the foam underbody 100 may comprise forktubes such that a forklift may be used to move the foam underbody 100. In embodiments, the means for lifting or otherwise moving the foam underbody 100 may be attached to a top surface of the foam underbody 100, such that the means for lifting or moving the foam underbody 100 do not interfere with the suitability of the foam underbody 100 for validating manufacturing equipment.

Figure 2:
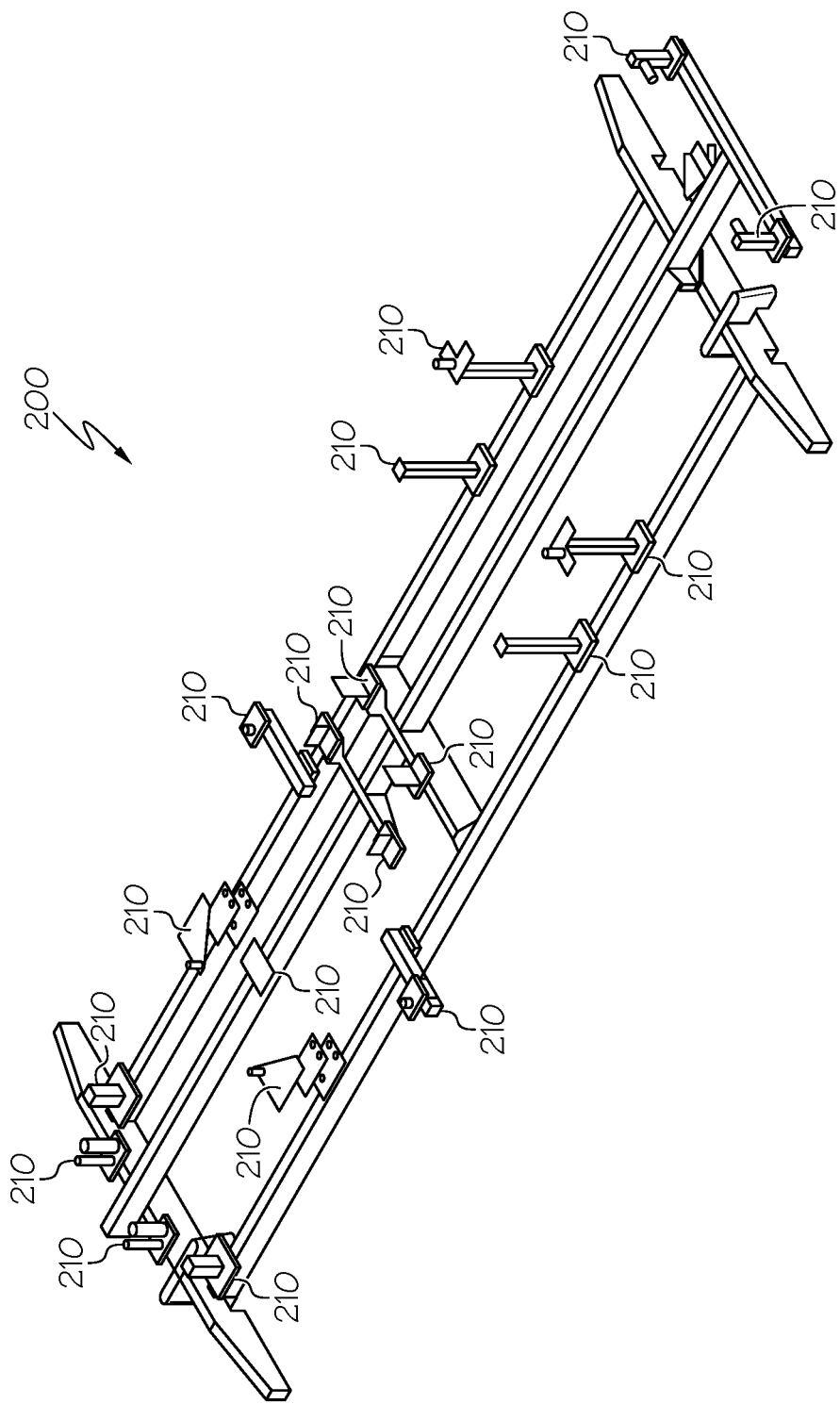
FIG. 2 schematically depicts a piece of manufacturing equipment, according of one or more embodiments disclosed herein.
Figure 3:
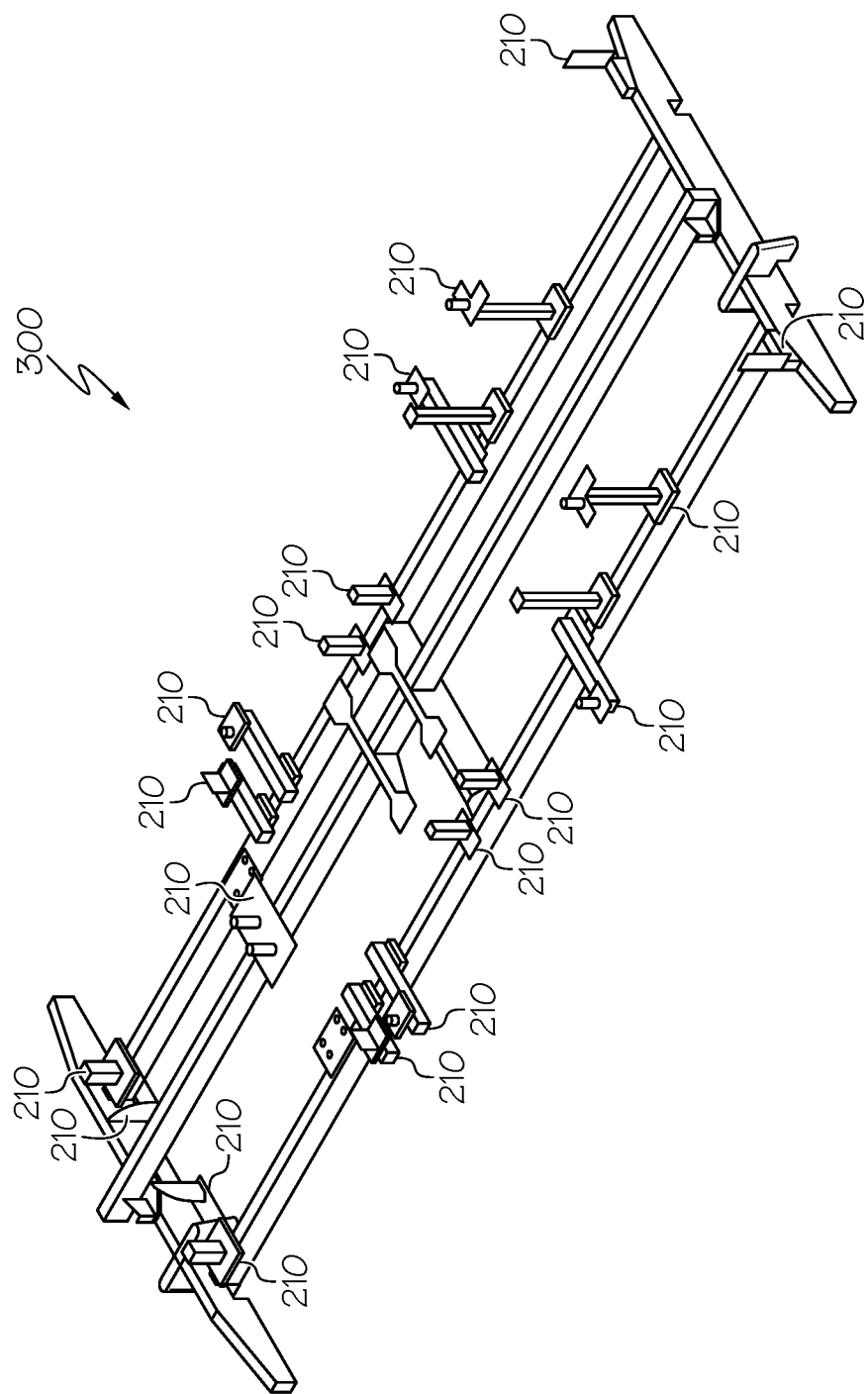
FIG. 3 schematically depicts a modified piece of manufacturing equipment, according to one or more embodiments disclosed herein.

Validating manufacturing equipment may include designing, adjusting, or modifying manufacturing equipment used for the production of motor vehicles. In embodiments, the validation process may be iterative. For example, and with reference to FIG. 1 and FIG. 2, a piece of manufacturing equipment 200 may be designed and produced having components 210 that are designed to contact the touchpoints of the underbody of a vehicle. The piece of manufacturing equipment 200 may then be tested using the foam underbody 100 by placing the foam underbody 100 on or adjacent to the piece of manufacturing equipment 200. The components 210 configured to contact the touchpoints of the vehicle of the piece of manufacturing equipment 200 may be modified by relocating them so that they contact or are adjacent to the touchpoints 110 of the foam underbody 100. The steps of testing and modifying the manufacturing equipment 200 may be repeated until the piece of manufacturing equipment 200 is operable for use during mass production of the vehicle. FIG. 3 depicts a modified piece of manufacturing equipment 300 where the components 210 configured to contact the touchpoints of the vehicle are aligned with the touchpoints 110 of the foam underbody 100.

In embodiments, the manufacturing equipment may include equipment operable to move the underbody of a vehicle through a manufacturing facility. For example, manufacturing equipment may include dollies, skids, lifters, conveyors, or any other suitable apparatus for moving the underbody of a vehicle through a manufacturing facility. Validating such manufacturing equipment may include determining whether the underbody of the vehicle may rest stably on such manufacturing equipment and whether such manufacturing equipment is suitable for supporting the weight of the underbody of the vehicle.

In embodiments, the outer shape or silhouette of the vehicle may be machined onto the foam underbody. For example, the shape or silhouette of the doors, the front end, the rear end, or other areas may be machined onto the foam underbody. These areas may be machined to the same design tolerances previously disclosed as the rest of the underbody. In embodiments, validating the manufacturing equipment may comprise moving the foam underbody through various manufacturing areas to confirm that sufficient clearance is present for the new vehicle. If sufficient clearance is not present, then the manufacturing area may be adjusted to accommodate the new vehicle.

In embodiments, validating the manufacturing equipment may include configuring robotic manufacturing equipment to interact with the underbody of the vehicle. Robotic manufacturing equipment may be used during the manufacturing of motor vehicles for painting, welding, assembling parts, removing material by trimming or cutting, and for performing various other tasks. At least some of these tasks include interactions between the robotic manufacturing equipment and the underbody of the vehicle. In embodiments, where large portions of the foam underbody are machined to a relatively high tolerance, the foam underbody may be suitable for configuring the robotic manufacturing equipment. Configuring robotic manufacturing equipment may include adjusting the robotic manufacturing equipment such that the robotic manufacturing equipment may interact with the underbody efficiently and without the binding of joints present in the robotic manufacturing equipment.

Validating the manufacturing equipment may occur before or during the production of a concept vehicle. Without wishing to be bound by theory, it is believed that a foam underbody may be machined as soon as the design for the vehicle is finalized and a three-dimensional model of the vehicle is produced. In embodiments, the foam underbody may be machined before the production of a concept vehicle begins. In alternative embodiments, the foam underbody may be machined during the production of a concept vehicle. Accordingly, validating the manufacturing equipment may occur in parallel with the production of the concept vehicle. This may allow a majority of the validation work to be completed by the time a concept vehicle is produced. By completing a majority of the validation work before a complete concept vehicle is available, the schedule for mass production of the vehicle may be accelerated by several months. For example, the mass production of the vehicle may be accelerated by about six months when a foam underbody is used to validate the manufacturing equipment.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method for validating manufacturing equipment for use during production of a motor vehicle, the method comprising:
   identifying touchpoints on an underbody of a vehicle using data from a three-dimensional model of the underbody of the vehicle;
   machining a foam underbody using the data from the three-dimensional model of the underbody of the vehicle; and validating manufacturing equipment using the foam underbody;

wherein:

the foam underbody comprises a foam;

the foam underbody comprises touchpoints corresponding to the touchpoints on the three-dimensional model; and at least the touchpoints of the foam underbody are machined to a tolerance of less than or equal to +/−3 millimeters with reference to the touchpoints on the three-dimensional model.

2. The method of claim 1, wherein at least the touchpoints of the foam underbody are machined to a tolerance of from +/−0.5 millimeters to +/−1.5 millimeters with reference to the touchpoints on the three-dimensional model.

3. The method of claim 1, wherein the foam underbody comprises a dense foam insert at at least one of the touchpoints on the foam underbody.

4. The method of claim 1, wherein the foam underbody comprises a metal insert at at least one of the touchpoints on the foam underbody.

5. The method of claim 1, wherein the three-dimensional model of the underbody of the vehicle comprises data on the mass of the underbody of the vehicle and the center of gravity of the underbody of the vehicle.

6. The method of claim 5, wherein the foam underbody comprises one or more cavities, such that a mass of the foam underbody is within 30% of a mass of the underbody of the vehicle referenced in the three-dimensional model of the underbody of the vehicle.

7. The method of claim 6, wherein validating the manufacturing equipment comprises determining whether the manufacturing equipment is suitable for supporting the weight of the underbody of the vehicle.

8. The method of claim 5, wherein the foam underbody comprises one or more cavities, such that a center of gravity of the foam underbody is within 500 mm in any direction from the center of gravity referenced in the three-dimensional model of the underbody of the vehicle.

9. The method of claim 8, wherein validating the manufacturing equipment comprises determining whether the underbody of the vehicle may rest stably on the manufacturing equipment.

10. The method of claim 1, wherein the manufacturing equipment comprises equipment operable to move the underbody of a vehicle through a manufacturing facility.

11. The method of claim 1, wherein validating manufacturing equipment comprises configuring robotic manufacturing equipment to interact with the underbody of the vehicle.

12. The method of claim 1, wherein the foam underbody comprises a polyurethane foam.

13. The method of claim 1, wherein machining the foam underbody comprises cutting, carving, grinding, sanding, punching, or drilling a volume of foam.

14. The method of claim 13, wherein the volume of foam comprises a block of polyurethane foam.

15. The method of claim 1, wherein validating the manufacturing equipment occurs before or during the production of a concept vehicle.

16. The method of claim 1, wherein validating the manufacturing equipment occurs before mass production of the motor vehicle.

* * * * *